May 22, 1934.  M. RONNING  1,959,689
COMBINE
Filed March 20, 1933  12 Sheets-Sheet 3

Inventor
MARTIN RONNING
By Paul, Paul & Moore
ATTORNEYS

May 22, 1934. M. RONNING 1,959,689
COMBINE
Filed March 20, 1933 12 Sheets-Sheet 6
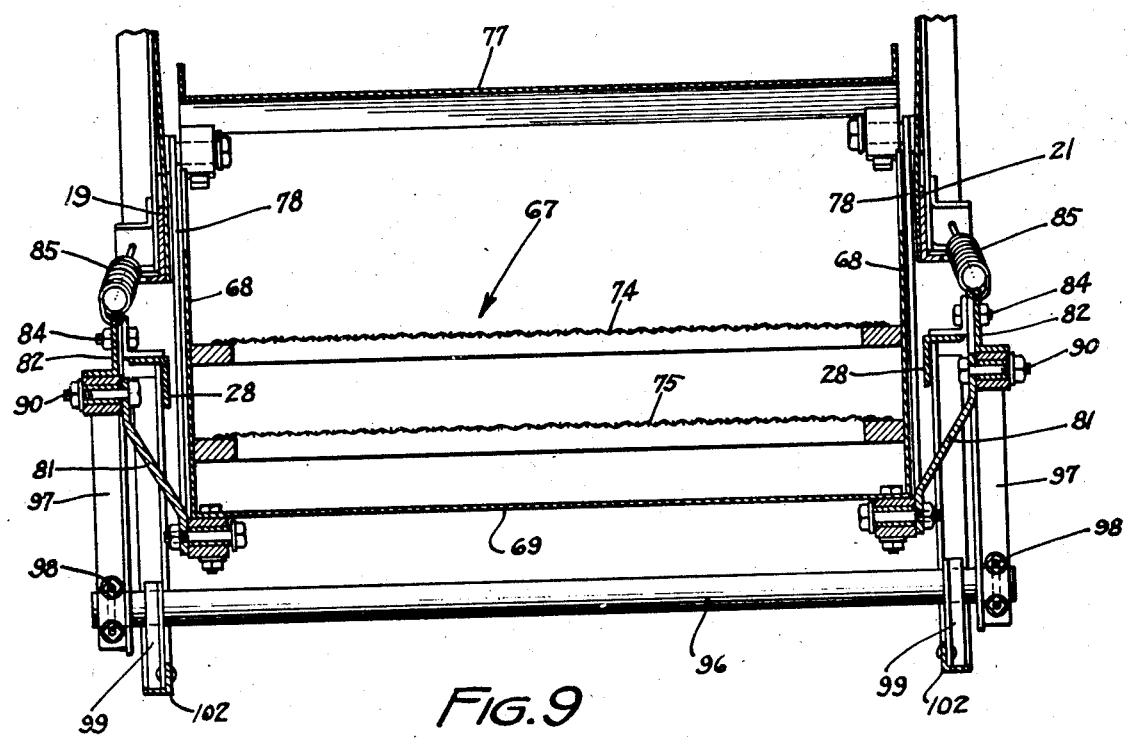
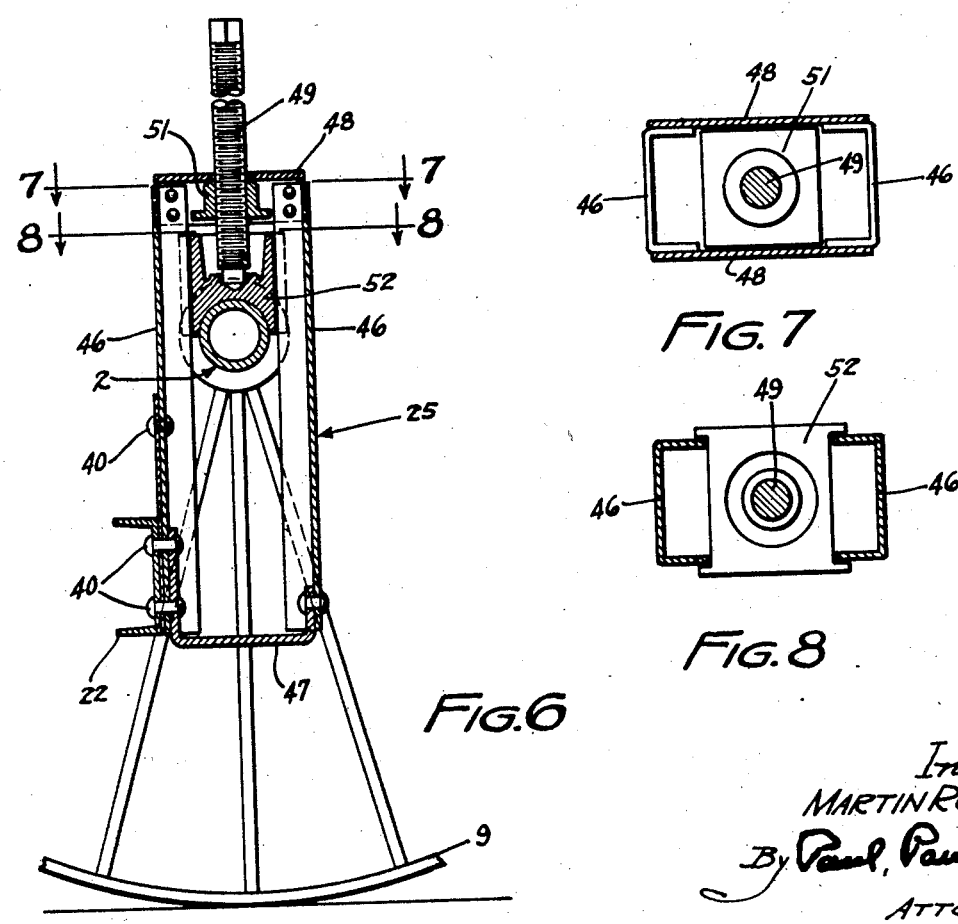
Inventor
MARTIN RONNING
By Paul, Paul & Moore
ATTORNEYS May 22, 1934.　　　　M. RONNING　　　　1,959,689
COMBINE
Filed March 20, 1933　　12 Sheets-Sheet 7

Inventor
MARTIN RONNING
By Paul, Paul & Moore
ATTORNEYS

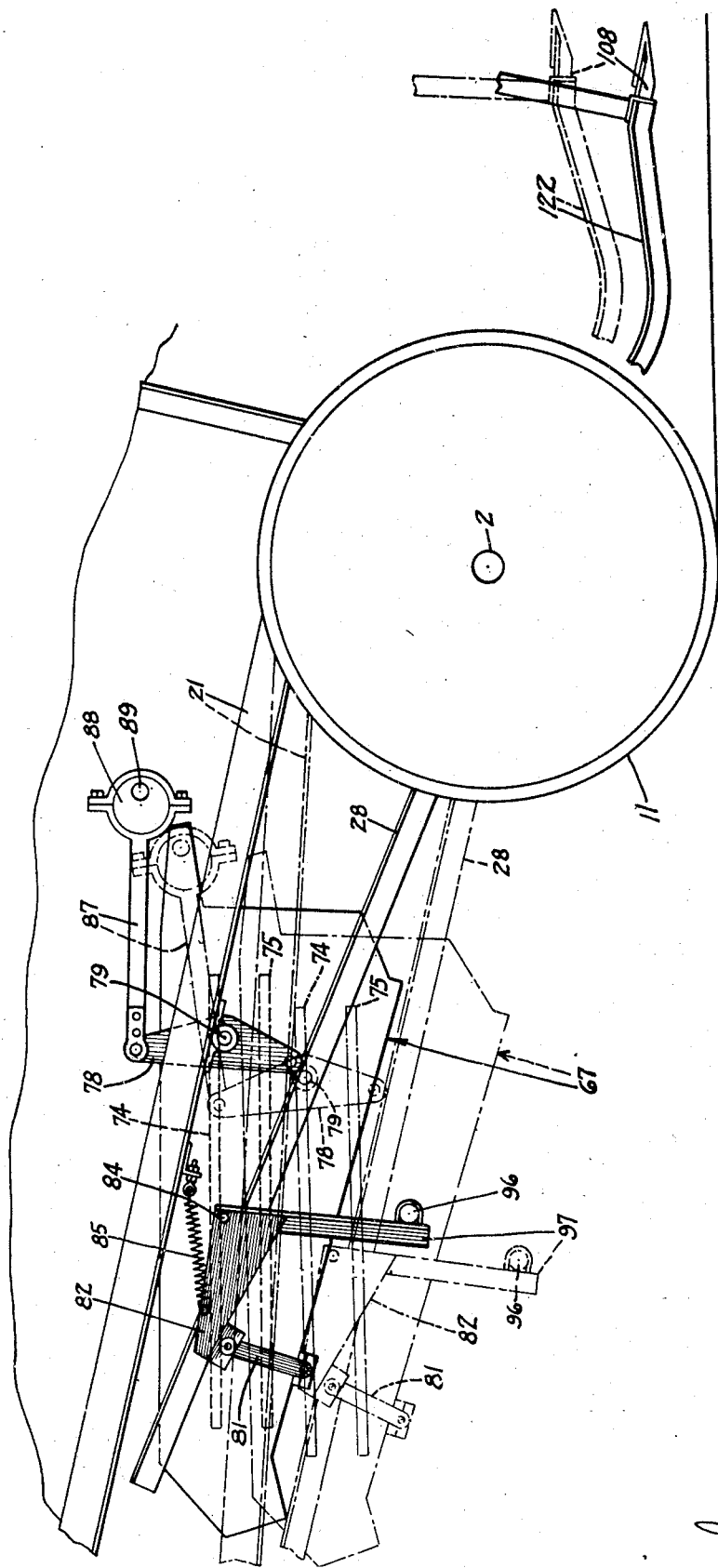

May 22, 1934. M. RONNING 1,959,689

COMBINE

Filed March 20, 1933 12 Sheets-Sheet 9

Inventor
MARTIN RONNING
By Paul, Paul Moore
ATTORNEYS

Inventor
MARTIN RONNING
ATTORNEYS

May 22, 1934.   M. RONNING   1,959,689
COMBINE
Filed March 20, 1933   12 Sheets-Sheet 11

INVENTOR.
MARTIN RONNING
BY
ATTORNEYS.

May 22, 1934.　　　　M. RONNING　　　　1,959,689

COMBINE

Filed March 20, 1933　　　12 Sheets-Sheet 12

Inventor
MARTIN RONNING
By Paul, Paul H Moore
ATTORNEYS

Patented May 22, 1934

1,959,689

UNITED STATES PATENT OFFICE 1,959,689

COMBINE

Martin Ronning, Minneapolis, Minn., assignor to Minneapolis-Moline Power Implement Company, Hopkins, Minn., a corporation of Delaware Application March 20, 1933, Serial No. 661,696

31 Claims. (Cl. 56—20)

This invention relates to new and useful improvements in apparatus of the class commonly known as combines, comprising means for cutting the grain, and means for threshing and cleaning the cut grain simultaneously as the apparatus is advanced, whereby the grain is harvested and threshed in one operation.

More particularly, the invention concerns itself with the provision of a tiltable combine for harvesting and threshing grain, and objects of the invention reside in the provision of an improved self-leveling shoe so supported that the harvester may be relatively adjusted or angularly disposed with respect to the ground without effecting the normal horizontal position of the screens and sieves of said shoe; in the means provided in connection with the spiral conveyer of the harvester for preventing the cut stalks of grain from rotating therewith, as they are conveyed to the thresher; in the specific construction of the main supporting frame structure, which comprises a truck having a main supporting axle upon which the thresher and harvester are substantially balanced; in the means provided on said truck for tilting the harvester and thresher to adjust the sickle bar relatively to the ground; in the means for supporting the thresher body upon the truck axle whereby the thresher may be vertically adjusted thereon to maintain it at substantially a normal level, regardless of the height of the sickle bar from the ground; in the means provided in connection with the adjusting means for permitting relative slippage thereof, should a portion of the thresher body or harvester accidentally engage the ground, whereby damage to said adjusting means is avoided; in the construction of the control means for said adjusting means, whereby the latter may be actuated by an operator positioned upon the truck, or by an operator positioned upon a tractor to which the combine may be coupled; and, in the general construction of the apparatus as a whole and in the organization of the various mechanisms thereof.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 6 is an enlarged detail sectional view on the line 6—6 of Figure 5, showing the means for vertically adjusting one side of the apparatus;

Figure 7 is an enlarged sectional plan view on the line 7—7 of Figure 6;

Figure 8 is a similar view on the line 8—8 of Figure 6;

Figure 9 is a detail sectional view on the line 9—9 of Figure 4, showing the means for supporting the rear end of the self-leveling shoe;

Figure 11 is a diagrammatic view illustrating the means for supporting the self-leveling shoe, and the means for causing it to automatically maintain a substantially horizontal position regardless of the tilting of the thresher body;

Main supporting structure

Figure 1:
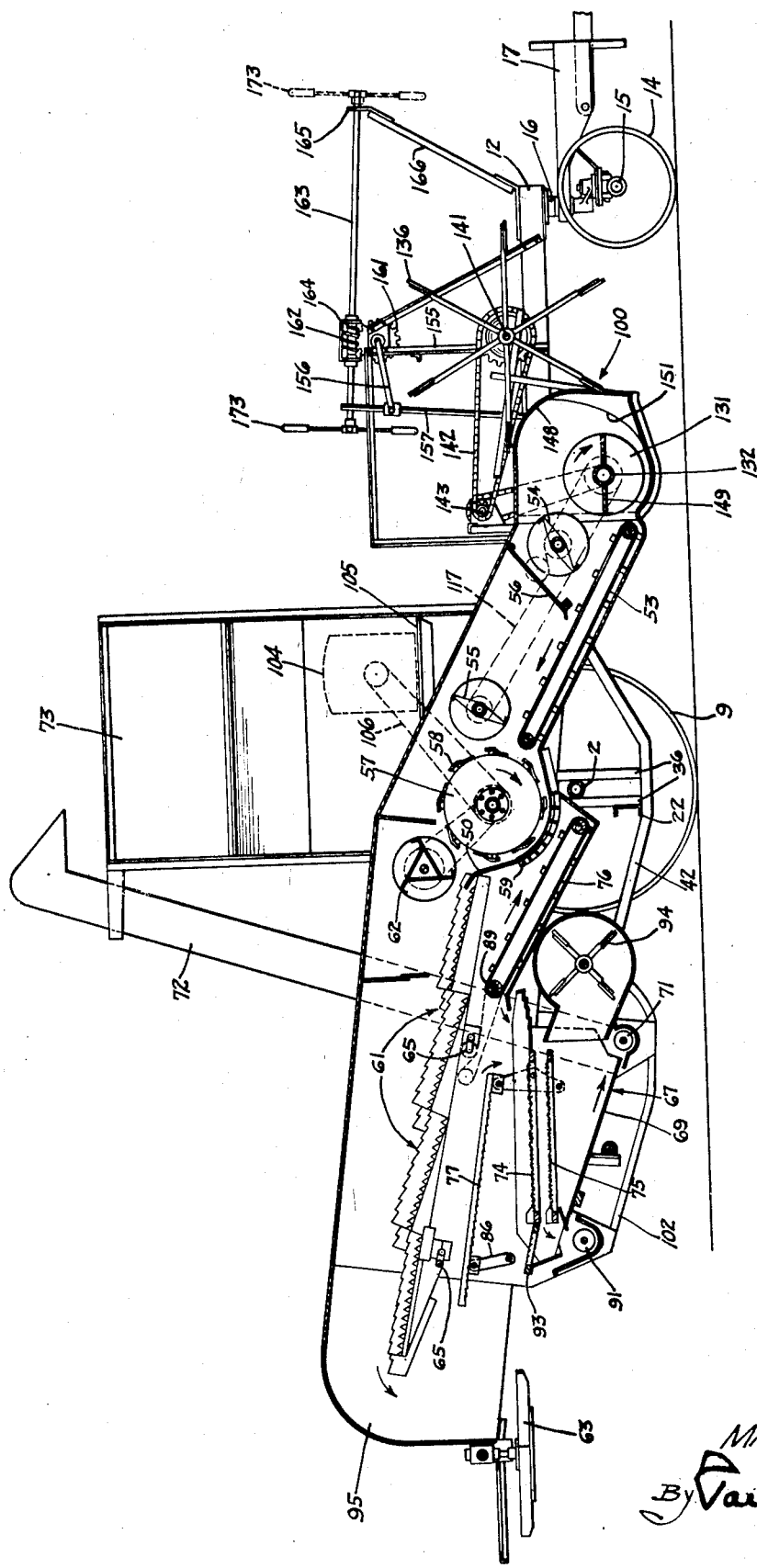
Figure 1 is a longitudinal sectional view substantially on the line 1—1 of Figure 2, showing the interior construction of the thresher.

The main supporting structure of the apparatus herein disclosed comprises an axle generally indicated by the numeral 2, and shown comprising tubular sections 3 and 4 connected together by a suitable connection 5, secured to the section 4 by such means as a rivet 6. Extensions 7 and 8 are secured to the ends of the axle upon which suitable carrying wheels 9 and 11, respectively, are mounted.

Figure 2:
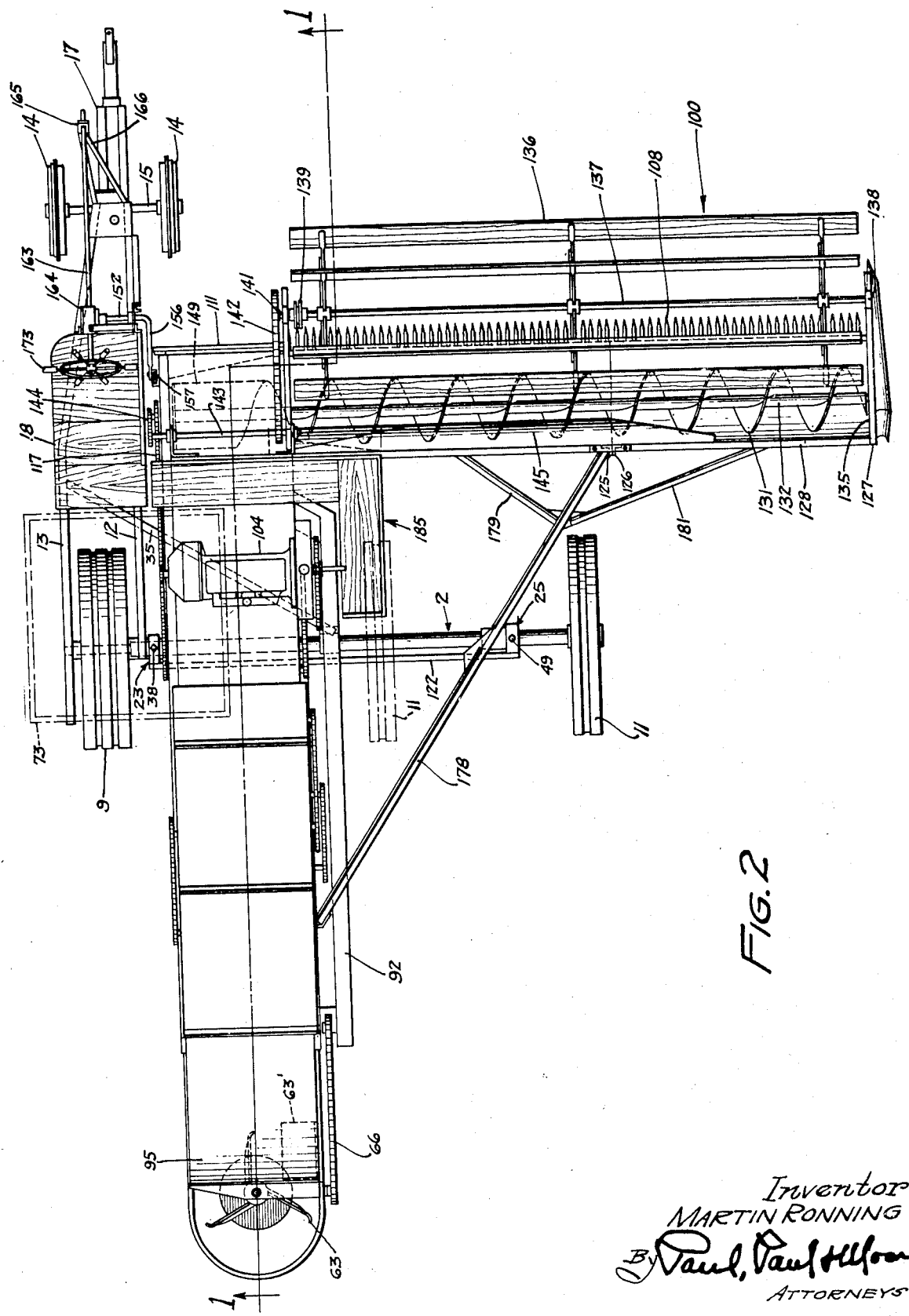
Figure 2 is a plan view of Figure 1.
Figure 3:
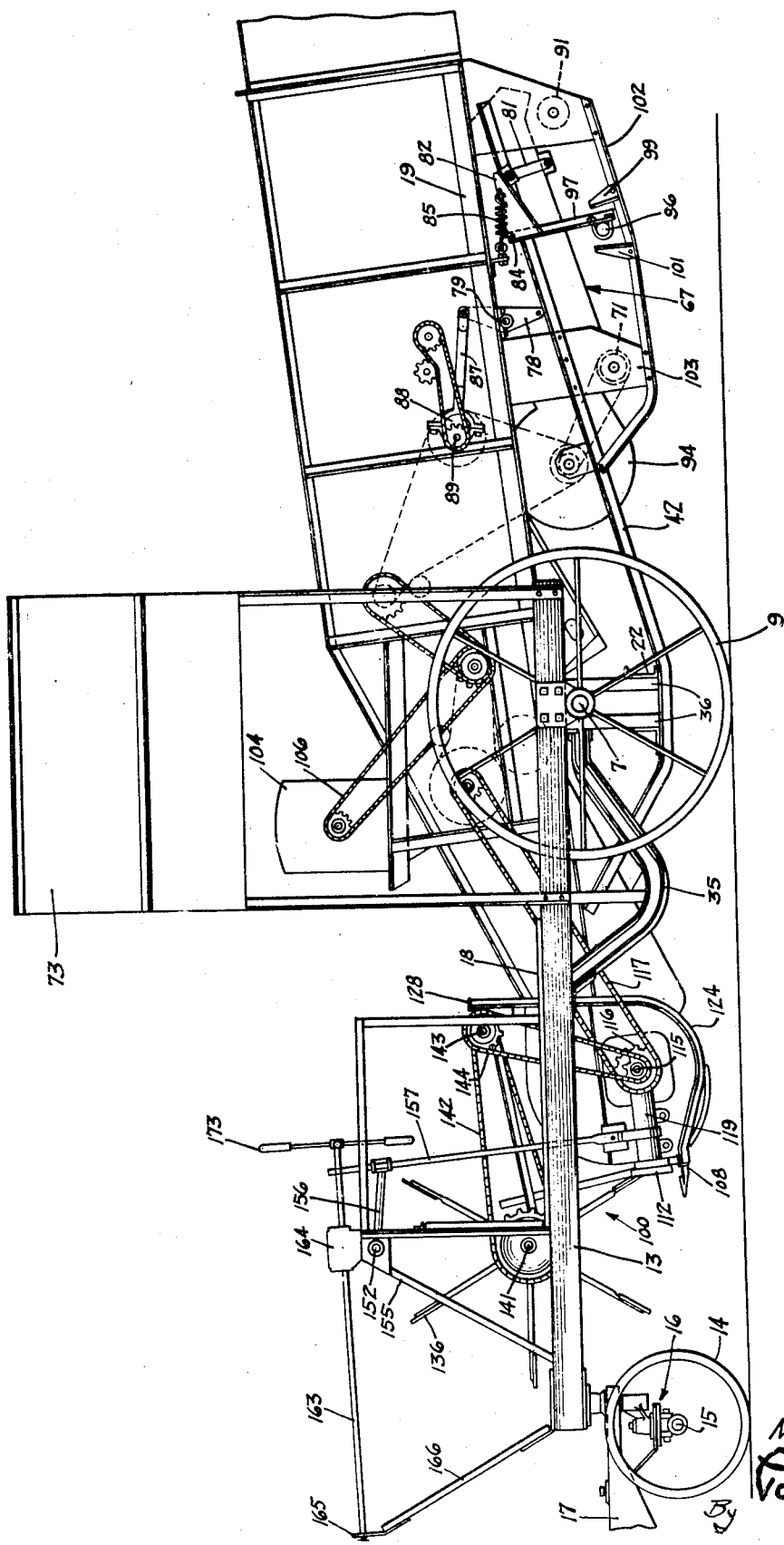
Figure 3 is an elevational view of the truck side of the apparatus.

A pair of frame members 12 and 13 have their rear end portions pivotally supported upon the axle 2 at opposite sides of the main supporting wheel 9, and extend forwardly therefrom as shown in Figures 1, 2, and 3. The forward ends of the frame members 12 and 13 may be supported upon a pair of wheels 14 mounted upon an axle 15, which is pivotally connected to the forward ends of the frame members by suitable means such as indicated generally by the numeral 16 in Figure 1. A suitable draft tongue 17 is operatively connected to the axle 15 whereby the apparatus may be coupled to a tractor or other power means. A suitable platform 18 is provided upon the frame members 12 and 13, as best shown in Figure 2, for the convenience of an operator. A diagonal brace 35 has one end secured to the axle 2 by a suitable clamping member 20 and a bolt 30, the latter passing through alined apertures provided in the tubular section 3 and member 5 of the axle. The brace 35 extends forwardly and has its opposite end suitably secured to the side rail 13, as will be clearly understood by reference to Figures 2 and 3. The axle 2, wheels 9 and 11, frame members 12 and 13, axle 15, wheels 14, platform 18, and the brace 35 cooperate to provide a structure which will hereinafter be refered to as the truck.

Thresher

Figure 4:
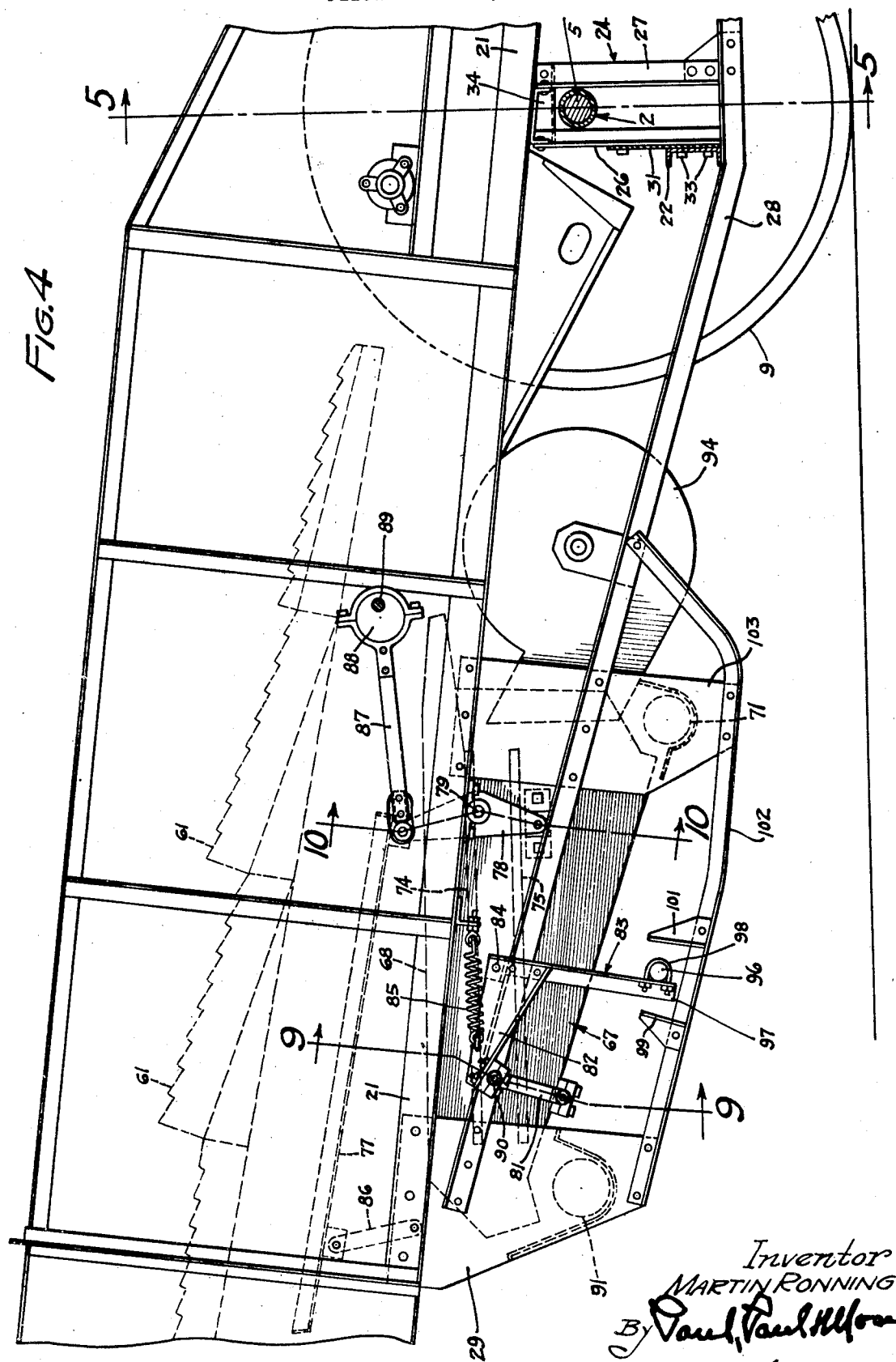
Figure 4 is an enlarged sectional elevation on the line 4—4 of Figure 5, showing the means for supporting the self-leveling shoe, a portion of the apparatus being broken away.
Figure 5:
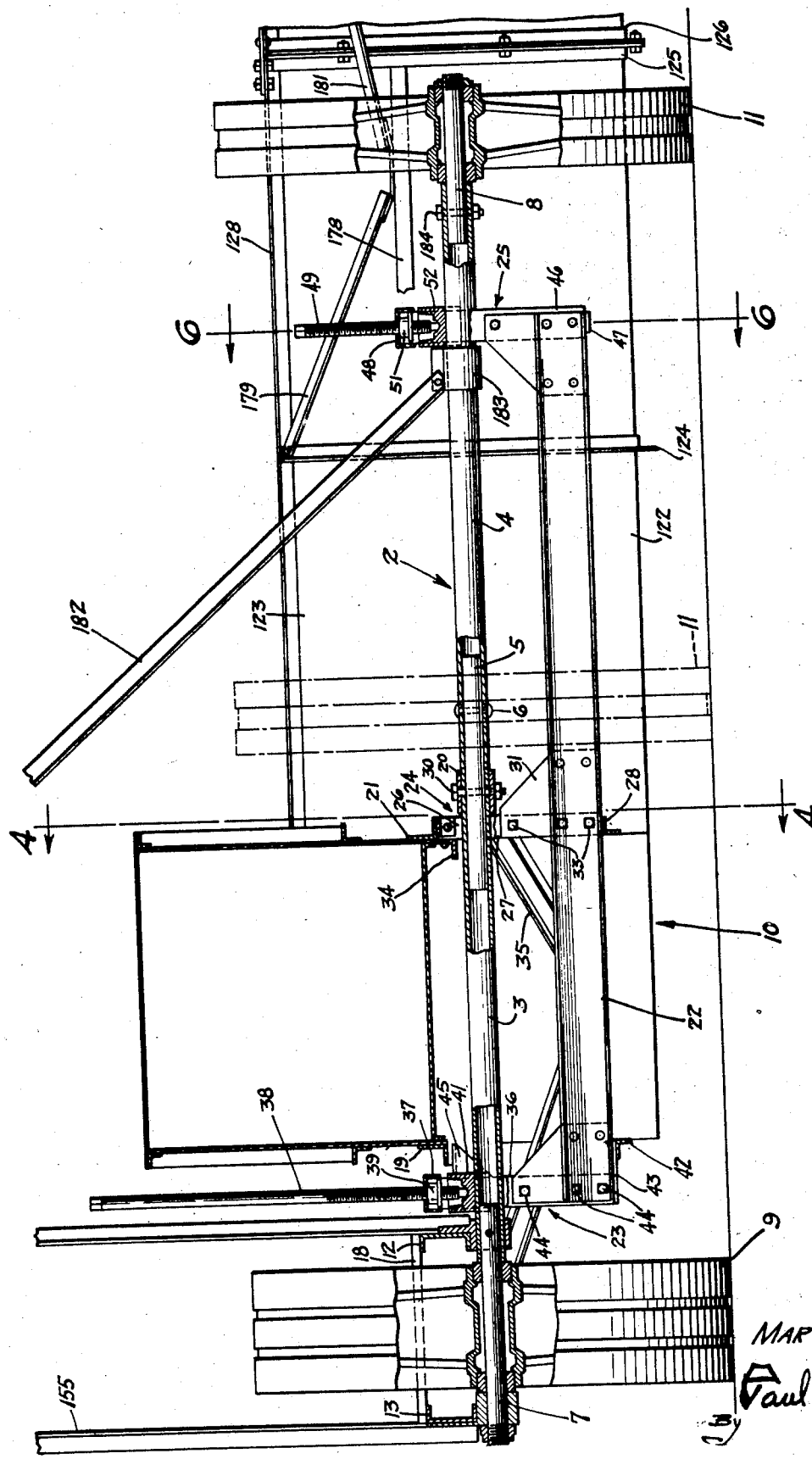
Figure 5 is a cross-sectional view substantially on the line 5—5 of Figure 4, showing the preferred construction of the main supporting axle, portions of the structure being omitted.

The thresher is generally illustrated in Figures 1, 2, and 3, and includes a suitable frame structure comprising side rails 19 and 21, having their forward intermediate portions supported upon a suitable truss frame, indicated generally by the numeral 10, and comprising a transverse truss member 22 and a plurality of upright structural frame portions 23, 24, and 25. The upright frame portion 24 is clearly shown in Figure 4, and comprises angle irons 26 and 27 having their upper ends suitably secured to the side rail member 21, as shown. The lower portion of the upright frame portion 24 has a brace member 28 secured thereto, one end of which extends rearwardly and is secured to a suitable gusset plate 29, the upper portion of which is secured to the rear end of the side rail member 21, as shown in Figure 4. The opposite end of the brace member 28 is suitably secured to the forward portion of the thresher body. A suitable gusset plate 31 is permanently secured to the truss member 22 by rivets 32, and is detachably secured to the angle iron 26 by bolts 33, some of which pass through the truss member 22, as shown in Figure 5. A suitable bracket 34 is fixed to the upper portions of the angle irons 26 and 27 and is adapted to engage the axle 2, as will be subsequently described. This bracket is clearly shown in Figures 4 and 5.

The upright frame portion 23 of the truss frame 10, is shown comprising opposed channel members 36, the upper ends of which are secured to a top piece 37 having a suitable aperture therein for receiving an adjusting screw 38. The screw 38 is received in threaded engagement with a nut 39, engaged with the top piece 37, as shown in Figure 5. The lower terminal of the adjusting screw or rod 38 is seated on a saddle 41 supported upon the axle 2. This saddle is vertically slidable between the channels 36.

The lower ends of the channel members 36 are suitably secured to a diagonal brace member 42 by a suitable gusset plate 43. This brace member 42 is similar to the brace member 28, and has its end portions secured to the thresher body in a similar manner. The transverse channel member 22 of the truss frame 10 is detachably secured to one of the upright channel members 36 by suitable bolts 44. The upper ends of the channel members 36 are fixedly secured to the side rail 19 of the thresher body by suitable angle brackets 45, as shown in Figure 5.

The upright frame portion 25 at the opposite end of the truss frame is clearly shown in Figures 5, 6, 7, and 8, and comprises inwardly facing channel members 46 having their lower ends secured together by a U-shaped member 47, and their upper ends secured together by a top piece 48. The adjacent end of the truss member 22 of the truss frame is fixedly secured to one of the channel members 46 by suitable rivets 40, as clearly shown in Figures 5 and 6. The top piece 48 is provided with an aperture adapted to receive an adjusting screw 49 received in threaded engagement with a nut 51 provided within the top piece 48. The lower terminal of the adjusting screw 49 is seated upon a saddle 52 which is engaged with the axle 2. By relatively rotating the adjusting screw 38 and 49, the thresher body may be vertically adjusted with respect to the ground. Said adjusting screws also provide means for leveling the thresher body in a cross-wise direction. The upper terminals of the adjusting screws 38 and 49 are preferably squared to receive a suitable instrument for rotating them.

The adjusting screws 38 and 49 are important in that they provide means for vertically adjusting the thresher body upon the axle 2, whereby said thresher body may be maintained at its normal level, regardless of the distance between the sickle and the ground. In other words, if the grain to be cut is extremely short, necessitating that the sickle be operated close to the ground, then the screws 38 and 49 are manipulated to relatively lower the thresher body upon the axle 2, and conversely, when the grain is long or tall, and the sickle bar is operated at some distance from the ground to leave longer stubbles, the screws 38 and 49 are manipulated to relatively vertically adjust the thresher body to a higher elevation upon the axle 2, to thereby maintain it at its normal level.

Figure 20:
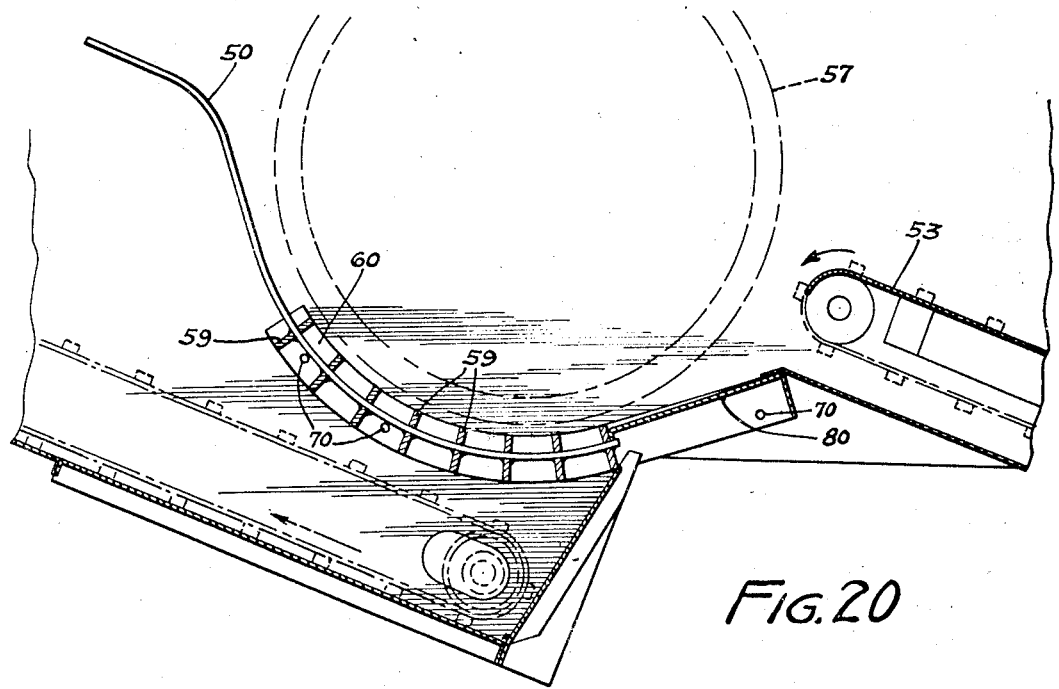
Figure 20 is an enlarged detail sectional view on the line 20—20 of Figure 21, showing the concave assembly which comprises the usual cylinder and grate bars.
Figure 21:
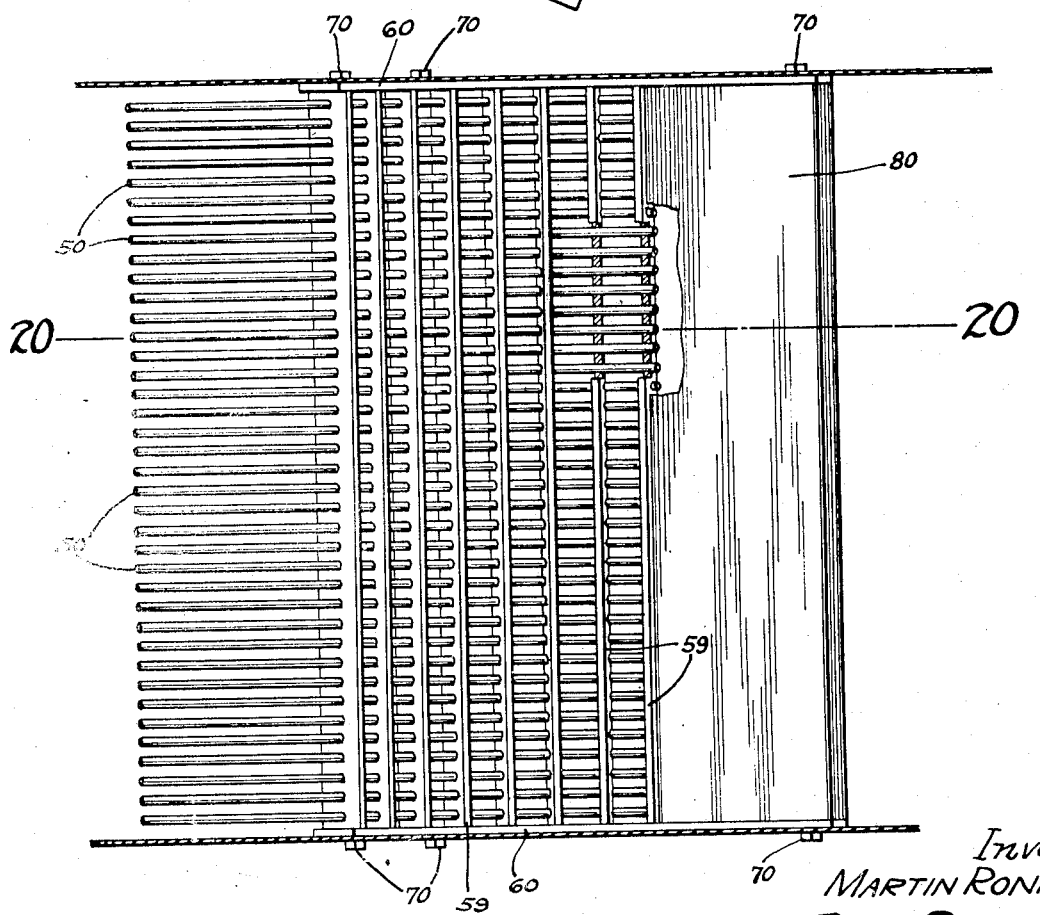
Figure 21 is a plan view of Figure 20 showing the preferred arrangement of the grate bars.

The thresher is shown provided at its forward end with the usual feeder conveyer 53 and beaters 54 and 55, and a baffle 56 which prevents a portion of the dust and chaff from discharging from the front end of the machine. The conveyer 53 delivers the cut grain to the usual threshing cylinder 57 which, in the present instance, is shown provided with a plurality of rasp bars 58 which cooperate with a plurality of grate bars 50 and concave bars 59 to thresh the grain. The grate bars 50 and concave bars 59 are secured together in spaced relation, as shown in Figures 20 and 21, and the terminals of the concave bars 59 are secured to curved side members 60, whereby a unitary structure is provided, which is secured in position between the side walls of the thresher by such means as bolts 70. An inclined plate 80 is provided between the discharge end of the feeder conveyer and the cylinder 57 to guide the cut grain into the cylinder and grate bar assembly. The threshed stalks of grain are discharged from the cylinder 57 onto the usual straw racks, indicated generally by the numeral 61 in Figure 1. A beater 62 is positioned adjacent to the cylinder 57 and beats the grain discharging from the cylinder to thereby effect a more thorough threshing of the grain.

Figure 12:
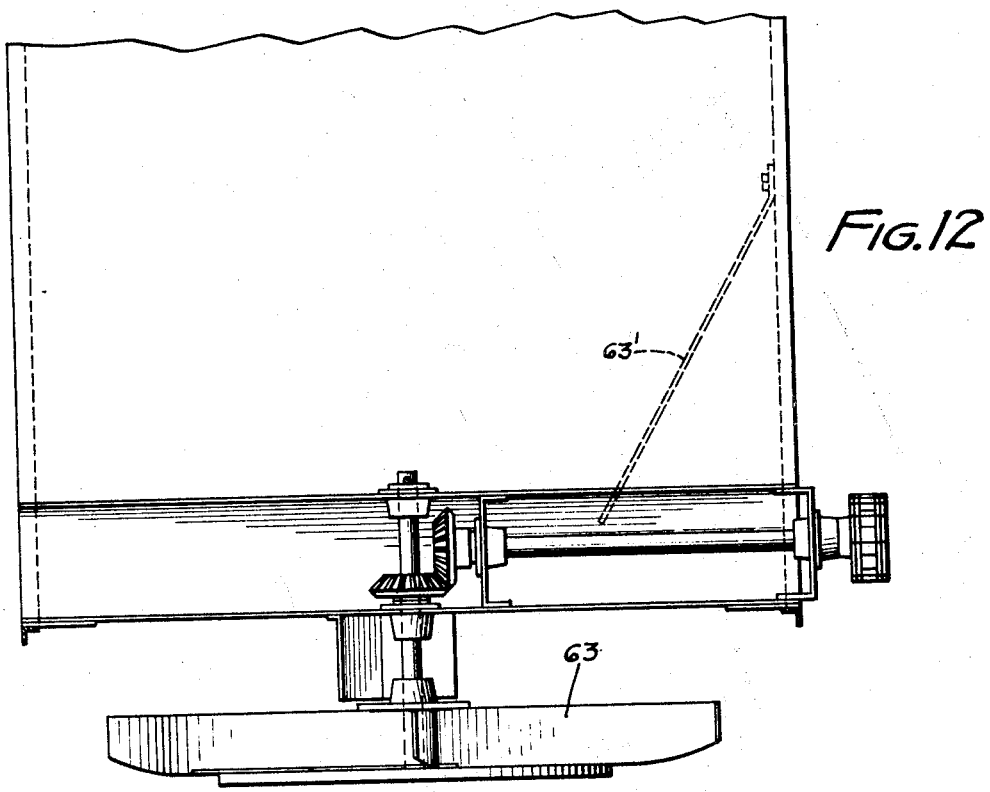
Figure 12 is a rear view of the straw spreader.
Figure 10:
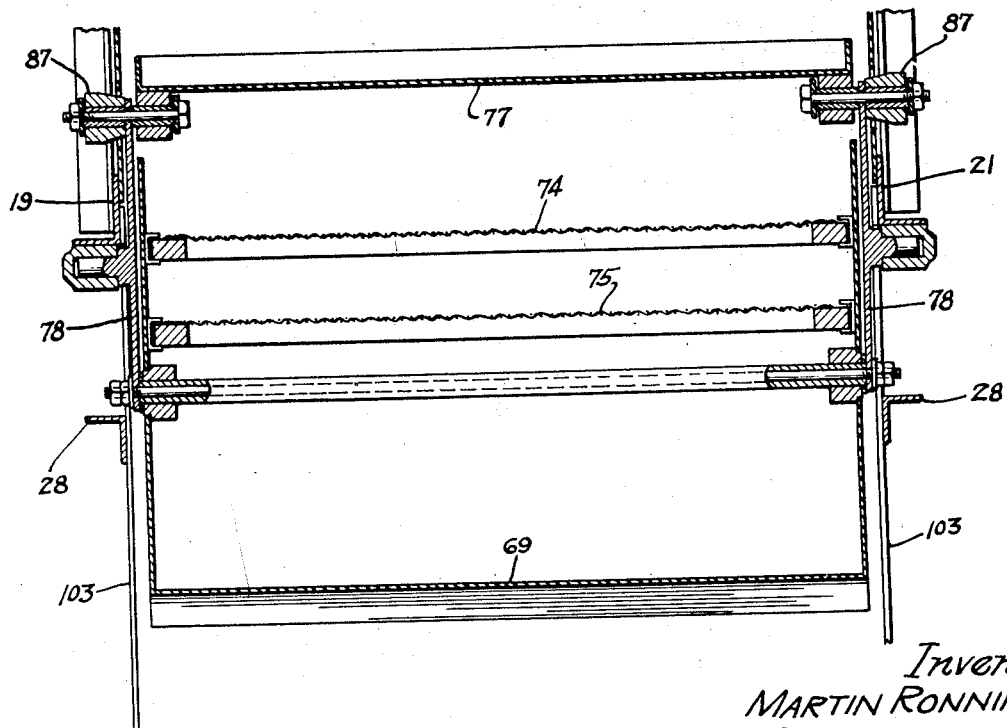
Figure 10 is a cross-sectional view on the line 10—10 of Figure 4, showing the means for supporting the forward end of the shoe.

The straw and coarser material which does not pass through the straw racks, is discharged from the rear end thereof onto the usual straw spreader 63, which acts to spread the straw over the ground as the apparatus moves forwardly. The straw racks 61 are operated by crank shafts 64 and 65, and the spreader is shown driven from the crank shaft 64 by a suitable chain drive 66. A deflector 63' is provided over the straw spreader 63 to direct the straw discharging from the straw racks at one side of the machine, towards the center of the spreader, as best shown in Figures 2 and 12.

Self-leveling shoe

One of the outstanding features of this invention resides in the construction of the grain cleaning shoe, indicated generally by the numeral 67 in Figures 4 and 11.

This shoe is shown comprising spaced side walls 68 and an inclined bottom wall 69, the lower end of which is positioned to discharge into a transverse grain conveyer 71 adapted to deliver the clean grain to an elevator 72 which elevates the grain into a suitable bin or hopper 73, provided with a normally closed discharge, not shown in the drawings. The usual screens 74 and 75 are mounted within the shoe 67 and are disposed in substantially a horizontal position so that the grain and other material delivered thereto will be fed in a rearward direction upon said screens by the shaking movement of the shoe. The grain is delivered to the upper or chaffer screen 74 of the shoe from the usual grain conveyer 76, and from the return bottom or plate 77 disposed above the shoe, below the straw racks 61, as clearly shown in Figure 1.

The forward end portion of the shoe is suspended from the lower ends of a pair of rocker arms 78, which are pivoted to the side frame members 19 and 21, as shown in Figures 4 and 11. The rear end portion of the shoe is suspended from a pair of links 81 having their lower ends pivotally connected thereto and their upper ends supported on pivots 90 provided upon the swingable ends of the horizontally disposed arms 82 of a pair of bell cranks 83. These bell cranks are pivoted at 84 to the diagonal brace members 28 and 42, as will be clearly understood by reference to Figures 4 and 11. Suitable tension springs 85 operatively connect the arms 82 of the bell cranks 83 to the side frame rails 19 and 21, whereby a portion of the weight of the rear end of the shoe will be carried by said springs. The return bottom or plate 77 is supported at its forward end by the upper portions of the rocker arms 78, and at its rear portion by a pair of links 86, as best shown in Figure 4.

A shaking motion is imparted to the shoe 67 and the return bottom or screen 77 by a pair of pitmans 87 having their rear end portions operatively connected to the rocker arms 78 and having their forward ends engaged with suitable eccentrics 88 secured to a shaft 89, which supports one end of the grain conveyer 76. By this arrangement, when the shaft 89 is rotated, a vibratory or shaking motion will be imparted to the shoe 67 and the return bottom 77. Referring to Figure 4, it will be noted that the upper end portions of the rocker arms 78 are mounted within the outer walls of the thresher, and the pitmans 87 are mounted exteriorly thereof.

The grain is delivered into the receiving end of the grain cleaning shoe 67 from the grain conveyer 76 and a return bottom or plate 77, as indicated by the arrows in Figure 1. The clean grain passing through the screens 74 and 75 of the shoe is delivered onto the inclined bottom wall 69 thereof from whence it discharges into the clean grain conveyer 71. The material discharging from the rear ends of the screens 74 and 75 is commonly known as tailings, and is delivered into the tailings conveyer 91 from whence it is delivered into a tailings conveyer 92 to be returned to the feeder conveyer 53 for a second separation. The upper screen 74 of the shoe is shown provided at its rear end with a short tailings chaffer 93 which prevents chaff and particles of the straw from dropping into the tailings conveyer 91.

A suitable cleaning fan 94 is positioned at the forward end of the shoe and has its discharge opening into the shoe so that an air blast is directed through the shoe to remove the dust and chaff from the grain delivered to the shoe, which dust and chaff is blown rearwardly into the hood 95 provided over the straw spreader 63, whereby said dust and chaff will be carried downwardly by the straw discharging onto the spreader 63 from the straw racks 61. The fan 94 is mounted independently of the shoe and does not vibrate or shake therewith.

In order to obtain a thorough separation of the grain from the chaff, dust, and other material delivered into the shoe, it is important that the screens 74 and 75 may be maintained in substantially horizontal positions, whereby the degree of cleaning will be substantially the same, regardless of the angular position of the thresher body with respect to the ground, as it is tilted about the axis of the main supporting axle 2. To maintain these screens in substantially horizontal positions, the rear portion of the shoe is supported from the swinging ends of the arms 82 of the bell cranks 83, which arms swing about the axes of the pivots 84.

To substantially balance the shoe and support it in substantially a horizontal position, regardless of the inclined position of the thresher body, lengthwise of the apparatus, a suitable weight 96 is secured to the downwardly extending arms 97 of the bell cranks 83, as shown in Figures 5, 9, 10 and 11. This weight, in the present instance, is shown as consisting of a piece of shafting or a cylindrical member extending from side to side of the apparatus, as shown in Figure 9. It is fixedly secured to the lower ends of the arms 97 by suitable U-clamps 98. The springs 85 counterbalance a portion of the weight of the rear end of the shoe and are so arranged that their tension does not greatly vary when the horizontal arms 82 of the bell cranks oscillate about the axes of the pivots 84. The weight 96 is of such size that it will normally be positioned substantially directly below the pivots 84, as shown in Figures 4 and 11, regardless of the tiltable position of the thresher body. Suitable limit stops 99 and 101 are provided for limiting the oscillatory movement of the arms 97 of the bell cranks 83, as shown in Figure 4. These stops are shown secured to a pair of guards 102, the forward ends of which are secured to the diagonal braces 28 and 42, and their rear end portions to the gusset plates 29. The guard rails are further braced by suitable gusset plates 103, the lower ends of which are secured thereto, while their intermediate and upper portions may be secured to the diagonal braces 28 and 42, and the side rails 19 and 21 of the thresher body, as clearly shown in Figure 4.

As a result of the rear end portion of the shoe being supported by the links 81, the shoe may be moved rapidly backwardly and forwardly by the rockers 78 without imparting any relative movement to the bell cranks 83, the links 81 oscillating from the pivots 90 connecting them to the arms 82 of the bell cranks.

In Figure 11, the full and broken lines indicate different positions which may be assumed by the shoe when the thresher body tilts about the axis of the main supporting axle 2. In this figure, it will be noted that the screens 74 and 75 of the shoe are maintained in substantially horizontal positions, regardless of the position of the thresher body with respect to the ground. This is important in that the shoe will always be supported on an even keel regardless of the position of the sickle bar of the harvester with respect to the ground, as shown in Figure 11. It is also to be noted that the shaking movement imparted to the shoe by the pitman 87 does not, in any way, affect the operation of the self-leveling mechanism of the shoe, which includes the bell cranks 83, links 81, springs 85, and weight 96.

The operating mechanism of the thresher is shown driven from a suitable motor or engine 104, mounted upon a suitable platform 105 provided upon the thresher body adjacent the forward end thereof. A chain drive 106 is shown connecting the engine to the shaft of the threshing cylinder 57. The various other mechanisms of the thresher may be driven from the cylinder shaft by suitable drives such as illustrated in Figures 1, 2, and 3.

Harvester

The harvester is generally indicated by the numeral 100, and comprises the usual sickle bar 108 and sickle 109, having one end of a pitman 111 connected thereto, the opposite end of which is connected to a crank disk 112 secured to the shaft 113, shown driven by a suitable bevel gear drive 114, from a shaft 115. A sprocket 116 is shown secured to the shaft 115 and has a chain 117 operatively connecting it with the shafts of the beaters 54 and 55. The beaters 54 and 55 are driven from the shaft of the threshing cylinder 57 by a suitable chain drive, indicated generally by the numeral 118 in Figure 3. The bevel gear drive 114 and shaft 113 are shown mounted within a suitable housing 119, shown adjustably secured to the end wall 121 of the harvester by suitable bolts 119'.

The harvester comprises a bottom wall 122 shown inclined downwardly and rearwardly from the sickle bar, and curving upwardly and terminating in an upright rear wall 123 which is suitably reinforced by spaced angle irons 124, 125, 126, and 127. The upper edge of the wall 123 and the upper terminals of the angle irons 124 are suitably braced together by a horizontally disposed angle iron 128 suitably secured thereto and extending lengthwise of the harvester, as shown in Figures 2 and 5.

Figure 18:
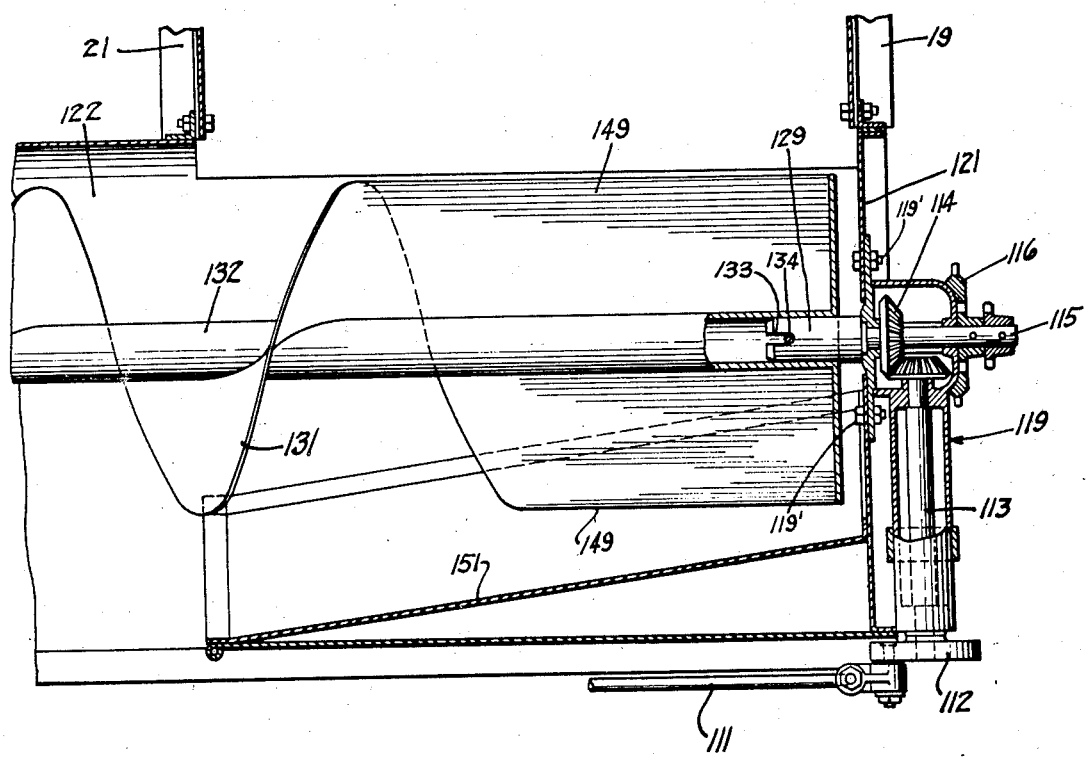
Figure 18 is a detail sectional view on the line 18—18 of Figure 13, showing the means for driving the spiral conveyer, and also showing the construction of said conveyer adjacent to the thresher.

The shaft 115 has an enlarged end portion 129 extending inwardly beyond the wall 121 of the harvester, and is adapted to support one end of a spiral conveyer 131 comprising a tubular member 132, one end of which is adapted to receive the enlarged portion 129. The portion 129 is provided with a terminal slot 133 adapted to receive a pin 134 secured in the walls of the tubular member 132 of the conveyer, as shown in Figure 18, and whereby the conveyer is driven directly from the shaft portion 129. The opposite end of the conveyer is suitably supported in the outer wall 135 of the harvester.

Figure 13:
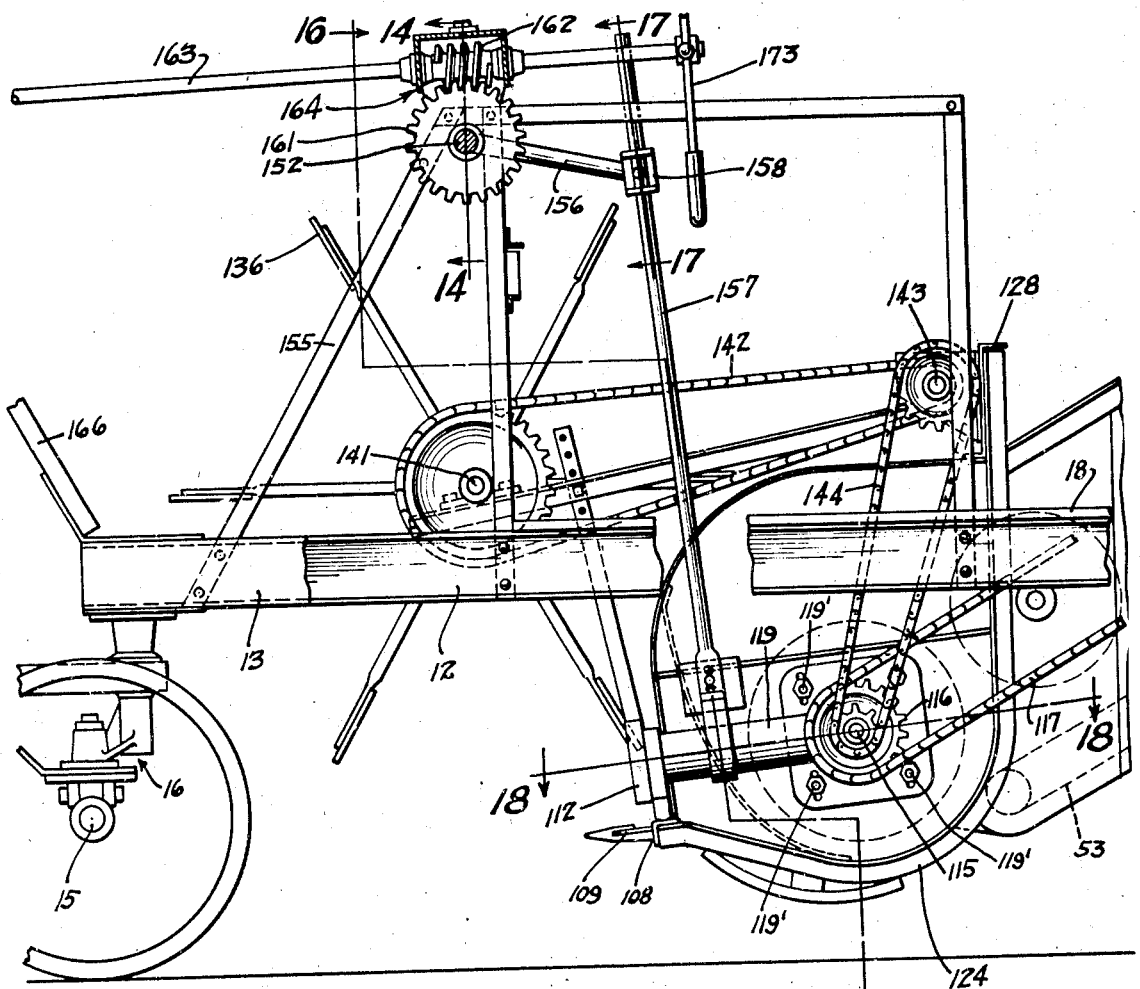
Figure 13 is an enlarged detail view, partially in section, showing the means for angularly adjusting or tilting the harvester and thresher whereby the sickle bar may be relatively adjusted with respect to the ground level.

The usual reel 136 is shown mounted above and forwardly of the sickle bar and comprises a shaft 137 having its outer end journaled in a suitable bearing 138 removably secured to a suitable support provided at the outer end wall of the harvester, and whereby it may readily be detached. The inner end of the reel shaft is secured to one side of a suitable slip coupling 139, the opposite side of which is secured to a shaft 141 having a chain drive 142 operatively connecting it to one end of a shaft 143, the opposite end of which is driven by a chain 144 from the shaft 115, as best shown in Figures 2 and 13. The reel is mounted for vertical adjustment whereby it may be positioned to suit the height of the grain.

Another important feature of the invention resides in the means provided for preventing the cut stalks of grain from rotating with the spiral conveyer 131, as the grain is fed towards the intake of the thresher by said conveyer. Such means is clearly shown in Figures 2, 16, and 19, and comprises a suitable guard, indicated generally by the numeral 145. This guard is shown having a horizontal wall portion 146 which is suitably secured to the back wall 123 of the harvester, and a downwardly and forwardly extending wall portion 147, the lower edge of which terminates adjacent to the periphery of the spiral conveyer 131. The guard 147 extends outwardly from the thresher and has its outer end terminating beyond the intermediate portion of the harvester, as shown in Figure 2. As the cut stalks of grain fall towards the spiral conveyer 131 from the sickle 109, they are conveyed to the rear of the conveyer and along the back wall 123 of the harvester in a direction towards the thresher. Because of the length of the sickle bar, more grain is conveyed by the spiral conveyer 131 at its inner end than at its outer end, which sometimes results in the grain tending to rotate with said conveyer as it approaches the thresher. Such rotation of the grain stalks is positively prevented by the provision of the guard 145, as will be clearly seen in Figure 19, wherein the grain stalks are shown engaged with said guard which supports them in substantially a vertical position, in which position they are delivered into the receiving end of the thresher.

The receiving end of the thresher is enclosed by a curved wall 148 provided with an opening on the harvester side to receive the conveyer 131 and the cut grain conveyed thereby. The guard 145 extends into the housing 148 so as to guide the grain into the receiving end of the thresher.

Figure 16:
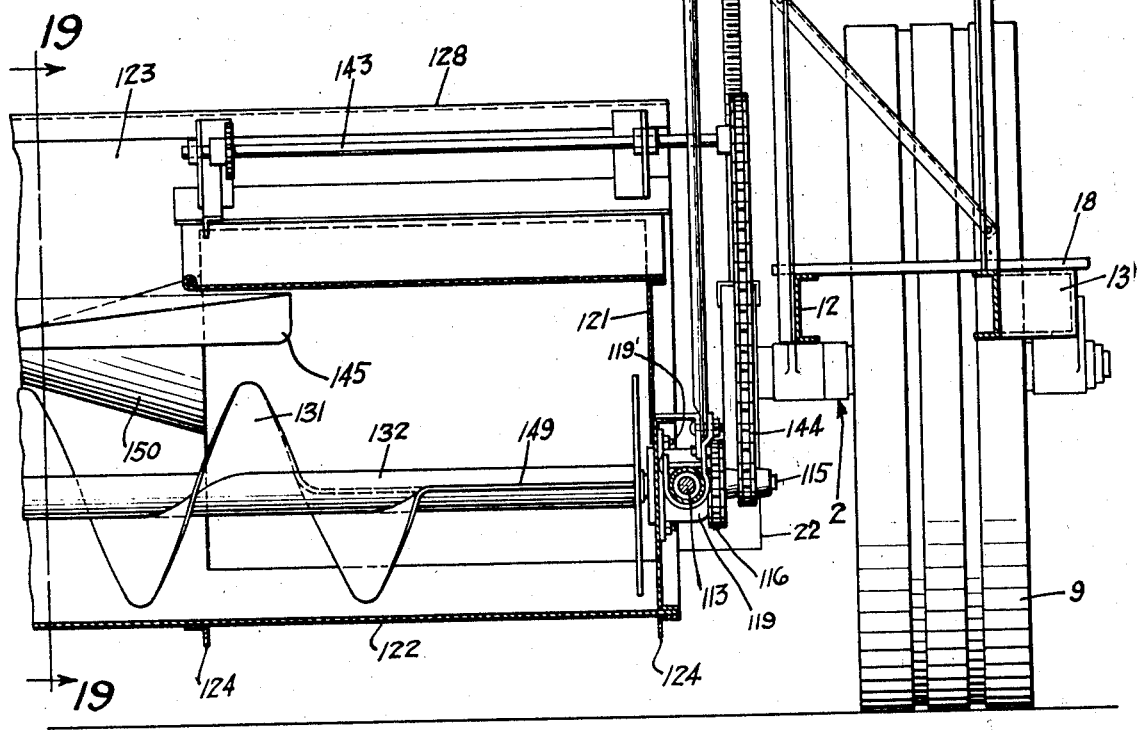
Figure 16 is an enlarged detail sectional view on the line 16—16 of Figure 13, showing the means for tilting the harvester and thresher about the axis of the main supporting axle.
Figure 19:
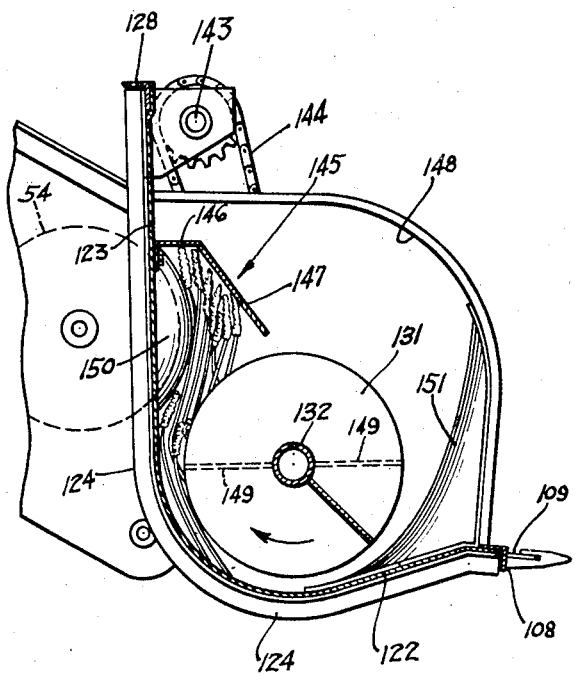
Figure 19 is a cross-sectional view on the line 19—19 of Figure 16.

At the intake of the thresher, the spiral vanes of the harvester conveyer 131 terminate in diametrically opposed blades 149 which extend from the wall 121 of the harvester to a point beyond the intermediate portion of the intake of the thresher, as clearly illustrated in Figures 2 and 18. These blades operate to feed the cut stalks of grain onto the feeder conveyer 53, as will be readily understood by reference to Figure 1. An inclined curved wall 151 is provided within the housing 148 of the intake end of the thresher to direct the cut grain inwardly to a position where it may be picked up by the blades 149 and fed onto the feeder conveyer 53. A curved guard 150 is provided adjacent the intake of the thresher to prevent the cut grain from contacting with the ends of the feeder beater 54, as it is delivered to the thresher. This guard is shown in Figures 16 and 19. Thus, by means of the guard 145, blades 149, and curved inclined wall 151, the grain will be fed into the thresher without congestion.

Adjusting means

The means for tilting the thresher and harvester upon the main supporting axle 2 to adjust the sickle bar relatively to the ground, is best shown in Figures 1, 2, 13, and 16, and comprises a shaft 152 mounted in suitable bearings 153 and 154 provided upon an upright frame structure 155, which forms a part of the truck. One end of the shaft 152 is bent to provide an arm 156 which has a pivotal connection with a lifting rod 157 by means of a bracket 158, adjustably secured to the rod 157 by a suitable screw 159. The lifting rod 157 is suitably secured to the housing 119, as shown in Figures 13 and 16.

A worm wheel 161 is mounted for relative rotation upon the shaft 152 and meshes with a worm 162 secured to an operating shaft 163, mounted in suitable bearings provided in a bracket, indicated generally by the numeral 164, and which also forms the bearing 154 of the shaft 152. The bracket 164 is suitably secured to the upright frame structure 155 of the truck. The opposite end of the shaft 163 may be supported in a suitable guide 165 provided upon a suitable support 166, secured to the truck.

Figure 14:
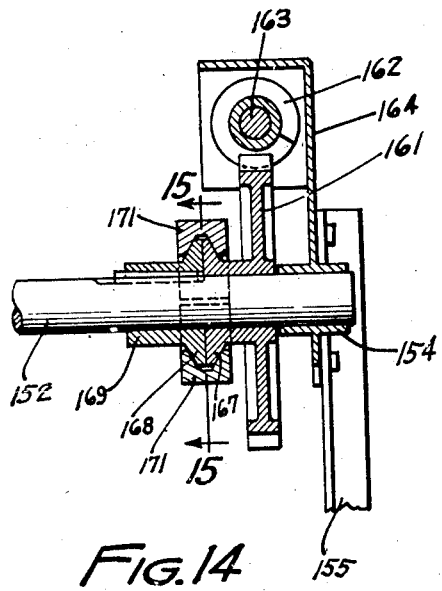
Figure 14 is an enlarged detail sectional view on the line 14—14 of Figure 13, showing the slip clutch for preventing damage to the adjusting means for tilting the thresher and harvester, should the body of the thresher or harvester accidentally engage the ground.
Figure 15:
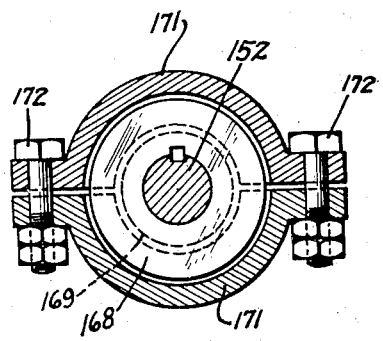
Figure 15 is a cross-sectional view on the line 15—15 of Figure 14.
Figure 17:
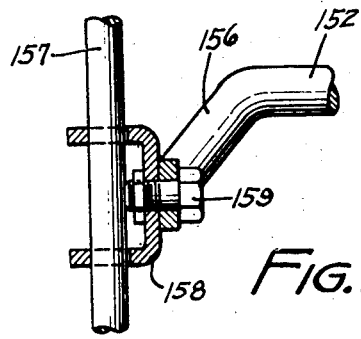
Figure 17 is an enlarged detail sectional view on the line 17—17 of Figure 13.

Another important feature of this invention resides in the means provided for preventing damage to the adjusting means, should the rear portion of the thresher or a portion of the harvester accidentally contact with the ground as, for example, if the main supporting wheel should drop into a depression in the ground surface. Such means is clearly shown in Figures 14 and 15, and comprises a friction device consisting of two annular beveled flanges 167 and 168, the former being integrally formed with the hub of the worm gear 161, and the latter upon a hub 169 which is keyed to the shaft 152. A pair of clamping elements 171, having beveled faces corresponding to the beveled faces of the flanges 167 and 168, encircle said flanges and are held in frictional engagement therewith by suitable clamping bolts 172. The adjacent faces of the flanges 167 and 168 are held in frictional engagement with each other by the action of the clamping elements 171, and the frictional engagement between said parts is such that should a portion of the thresher body or a portion of the harvester accidentally contact with the ground, slippage will occur between said flanges, thereby eliminating severe strains from the adjusting means. Under ordinary operating conditions, no relative movement takes place between the flanges 167 and 168.

A suitable hand wheel 173 is shown secured to the rear end of the control shaft 163, whereby an operator stationed upon the platform 18 of the truck may conveniently manipulate the adjusting means to vertically adjust the position of the sickle bar. This hand wheel is detachably secured to the shaft 163 so that if desired, it may be secured to the opposite end of the shaft, as indicated by the dotted lines in Figure 1.

Figure 22:
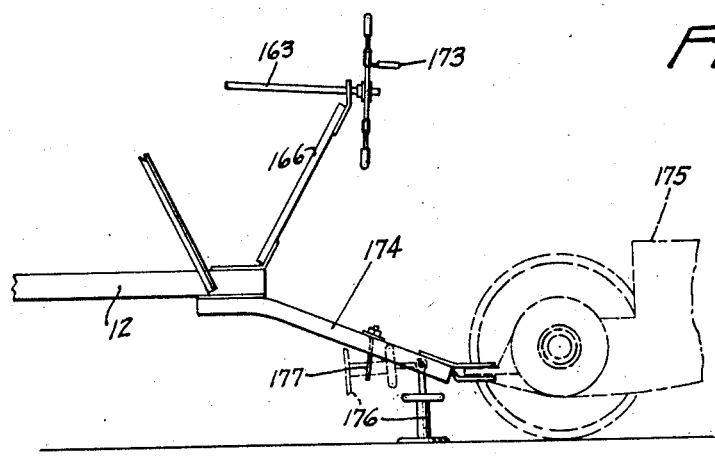
Figure 22 is a view showing a construction wherein the front wheels of the truck body have been dispensed with and the forward end portion of said truck body is directly connected to and supported upon the rear portion of a suitable tractor.

Figure 22 shows an arrangement wherein the front wheels 14 of the truck have been removed and a forwardly extending draft member 174 attached thereto in lieu thereof. This draft member is provided at its forward end with suitable means for coupling it to a conventional type of tractor 175, partially indicated in dotted lines. A suitable jack 176 is shown pivotally connected to the draft member 174 and provides means for supporting the forward end of the truck in such a position that it may be conveniently coupled to the tractor. When the apparatus is in operation, the jack may be swung to an out-of-the-way position, as indicated by the dotted lines, in which position, it may supported by a suitable securing means 177.

Detachability of harvester

To facilitate shipping, storage and transportation, the harvester is detachably secured to the thresher so that it may readily be detached therefrom. The harvester is also made in two sections, suitably bolted together at the angle irons 125 and 126 shown in Figures 2 and 5. The sickle bar being secured to the forward portion of the bottom wall 122 of the harvester is, of course, also made in two sections, whereby the outer section may be detached from the inner section at the juncture between the angle irons 125 and 126, whereby the overall width of the apparatus will be reduced sufficiently to permit the combine to pass through an ordinary farm gate. Also, by thus removing the outer section of the harvester, the apparatus may be conveniently stored in a relatively smaller building, when not in use.

A suitable diagonal brace 178 has its rear end detachably secured to the frame of the thresher and its forward end portion is suitably secured to the inner section of the harvester adjacent to the angle irons 125 and 126, as will be noted by reference to Figure 5. Auxiliary brace members 179 and 181 have their rear ends secured to the diagonal brace 178, and their forward ends to the inner and outer sections of the harvester by suitable means such as bolts (see Figure 5).

When the outer section of the harvester is detached, the auxiliary brace member 181 is detached from the diagonal brace 178 and the harvester. The reel 136 is then detached from the harvester by detaching the outer bearing 138 from its support and uncoupling the shaft 137 of the reel from the slip clutch 139. The sickle is then removed from the sickle bar by disconnecting the pitman 111 from the crank disk 12, whereby the sickle may be withdrawn from the sickle bar in the usual manner. The outer section of the harvester is then detached from the inner section by removing the bolts securing together the angle irons 125 and 126, after which the spiral conveyer 131 is detached from its supporting means. The inner end of the spiral conveyer, as hereinbefore stated, is operatively connected with the enlarged extension 129 of the shaft 115 by means of the drive pin 134, as shown in Figure 18, whereby when the outer section of the harvester is detached from the inner section, the bearing at the outer end of the spiral conveyer is pulled off the conveyer shaft, whereupon the entire conveyer may readily be detached from the apparatus.

To facilitate shipment of the apparatus, the entire harvester may be detached from the thresher by simply detaching the diagonal brace 178 from the thresher and harvester, and then detaching the inner section of the harvester from the forward end of the thresher. The inner end of the harvester is detachably secured to the thresher by suitable means such as bolts, not shown in the drawings.

When the harvester is thus removed from the thresher, the truss member 22 is detached from the upright frame portions 23 and 24 by removal of the bolts 44 and 33, after which the outer section 4 of the supporting axle 2 is detached from the inner section by removal of the bolt 30 which secures the diagonal brace 35 to the axle 2. Before removing the outer axle section 4, however, a diagonal brace 182 having its upper end secured to the hopper or bin 73 and its lower end to a collar 183 secured to the axle, is detached, whereupon the outer axle section 4 may readily be detached from the inner section 3, together with the truss member 22. The axle extension 8 secured to the outer section 4 of the axle, is then detached from said section by removal of the bolt 184, whereupon this section 8 may be inserted into the inner axle section 3, to thereby position the wheel 11 as indicated by the dotted lines in Figures 2 and 5. By thus detaching the entire harvester from the thresher and moving the wheel 11 inwardly to a position adjacent to the thresher body, it will be noted that the overall width of the apparatus is reduced to less than half of its normal width, whereby the apparatus may be conveniently placed upon a freight car for shipment.

All of the parts are so constructed that the harvester may readily be removed in part or in its entirety, from the thresher, which is an important feature in that it greatly facilitates shipping, storage, and transportation. When the harvester is removed from the thresher, as above described, and the wheel 11 is moved to the dotted line position shown in Figure 5, the angle bracket 34 will directly engage the axle portion 3 and thereby carry the load of that side of the thresher body.

The entire apparatus is comparatively simple in construction and all of its various mechanisms are so organized and interconnected that the apparatus may be made relatively small in size and yet maintain a high capacity. A suitable platform 185 is provided upon the thresher for the convenience of the operator so that he may readily view and inspect the operation of the apparatus while in operation. It is also to be noted that the operator's station is situated upon the truck so that the weight of the operator does not, in any way, effect the up-and-down movement of the thresher body, when tilted about the axis of the main supporting axle 2, in the operation of vertically adjusting the position of the sickle bar with respect to the ground.

I claim as my invention:

1. In a combine, a thresher, a harvester, a main support therefor, means for tilting the thresher and harvester on said support to adjust the harvester relatively to the ground, a grain cleaning shoe in the thresher, and means for maintaining said shoe substantially in a horizontal position regardless of the tilting action of the thresher on said support.

2. In a combine, a thresher, a harvester, a pivoted support having the thresher and harvester counterbalanced thereon, means for tilting said support thereby to adjust the height of the harvester, a grain cleaning shoe in the thresher, and means for automatically maintaining the screens of said shoe in substantially horizontal planes upon inclination of the thresher resulting from a tilting of the support to adjust the harvester.

3. In a combine, a thresher, a harvester, a pivotally mounted main support upon which the thresher and harvester are counterbalanced, means for tilting said support about its pivotal axis whereby the thresher and harvester are displaced vertically and the harvester is adjusted relatively to the ground, a grain cleaning shoe in the thresher rearwardly of said support, means pivotally supporting one end of the shoe, and means operatively associated with the opposite end of said shoe for maintaining said shoe substantially in a horizontal position regardless of the tilting action of the thresher upon said support.

4. In a combine, a main support mounted to pivot about a horizontal axis transverse to the direction of travel, a thresher and a harvester rigidly secured to and counterbalanced upon said support, means for tilting said support about said axis to adjust the harvester height, a grain cleaning shoe forming part of said thresher, and means for automatically maintaining the screens of said shoe in substantially horizontal planes during tilting of the support for the purpose of adjusting the harvester.

5. In a combine, a thresher, a harvester, a main support therefor, means for tilting the thresher and harvester on said support in a plane lengthwise of the apparatus, a grain cleaning shoe in the thresher, means pivotally supporting the forward end of the shoe, and adapted to impart a shaking movement thereto, and means associated with the opposite end of said shoe for automatically maintaining the shoe in substantially a horizontal position regardless of the tilting action of the apparatus upon said support.

6. In a combine, a thresher, a harvester, a main support therefor, means for tilting the thresher and harvester on said support, a grain cleaning shoe in the thresher, rocker arms pivotally supporting one end of the shoe, links supporting the opposite end of the shoe, and means associated with said links for maintaining the shoe in substantially a horizontal position regardless of the tilting movement of the thresher upon said support.

7. In a combine, a thresher, a harvester, a main support therefor, means for tilting the thresher and harvester on said support to relatively adjust the harvester with respect to the ground, a grain cleaning shoe in the thresher, a rocker arm pivotally supporting one end of said shoe, a link supporting the opposite end of the shoe, a substantially horizontally disposed arm supporting said link, and means associated with said arm for maintaining the shoe in substantially a horizontal position regardless of the tilting movement of the thresher upon said support.

8. In a combination harvester and thresher, a transversely disposed axle for supporting the harvester and thresher and about which they may tilt to adjust the harvester with respect to the ground, a grain cleaning shoe in the thresher, means for pivotally supporting one end of the shoe, a link for supporting the opposite end thereof, relatively movable means for supporting said links, and means operatively associated with said movable means for maintaining said shoe in substantially a horizontal position, regardless of the tilting movement of the thresher upon said axle.

9. In a thresher mounted for pivotal movement about a transverse axis, a grain cleaning shoe mounted for shaking movement therein and supported upon a plurality of transverse pivots, vertically movable means supporting certain of said pivots, and means associated with said vertically movable means for automatically raising or lowering the end of the shoe associated therewith to thereby maintain the shoe in substantially a horizontal position.

10. In a thresher mounted for pivotal movement about a transverse axis, a grain cleaning shoe mounted for shaking movement therein and supported upon a plurality of transverse pivots, vertically movable means supporting certain of said pivots, means associated with said vertically movable means for automatically raising or lowering the end of the shoe associated therewith to thereby maintain the shoe in substantially a horizontal position, and resilient means for counterbalancing a portion of the weight of the shoe.

11. In a thresher mounted for pivotal movement about a transverse axis, a grain cleaning shoe mounted for shaking movement therein and supported at one end upon a plurality of transverse pivots, links supporting the opposite end of the shoe, movable means supporting said links and adapted to raise or lower the end of the shoe associated therewith, and a weight associated with said movable means for maintaining the shoe in substantially a horizontal position regardless of the pivotal movement of the thresher about said axis.

12. In a thresher mounted for pivotal movement about a transverse axis, a grain cleaning shoe mounted for shaking movement therein and supported at one end upon a plurality of transverse pivots, links supporting the opposite end of the shoe, horizontally disposed pivoted arms supporting said links, yieldable means associated with said pivoted arms for counterbalancing a portion of the weight of said shoe, and a weight operatively connected with said arms and adapted to maintain the shoe in substantially a horizontal position regardless of the pivotal movement of the thresher upon said axis.

13. In a thresher mounted for pivotal movement about a transverse axis, a grain cleaning shoe in the thresher, rocker arms for supporting one end of the shoe, links pivotally connected to said shoe adjacent the opposite end thereof, bell cranks pivoted on the thresher frame and supporting said links, and means associated with said bell cranks for automatically leveling the shoe regardless of the tilting movement of the thresher upon said transverse axis.

14. In a thresher mounted for pivotal movement about a transverse axis, a grain cleaning shoe in the thresher, rocker arms for supporting one end of the shoe, means for imparting a shaking movement to the shoe, links pivotally connected to said shoe adjacent the opposite end thereof, bell cranks pivoted on the thresher frame and supporting said links, a weight associated with said bell cranks for automatically leveling the shoe regardless of the tilting movement of the thresher upon said transverse axis, and means for counterbalancing a portion of the weight of said shoe.

15. In a thresher, a frame, a grain cleaning shoe mounted therein, hangers pivotally mounted on said frame and supporting one end of the shoe, arms pivoted on said frame at points intermediate the ends of said shoe, links depending from said arms and pivotally connected with the opposite end portion of the shoe, resilient means connected with said arms and counterbalancing a portion of the weight of the shoe, and a weight connected to said arms and normally retaining them in substantially horizontal positions to thereby maintain the shoe in substantially a horizontal position lengthwise of the thresher.

16. In a thresher, a frame, a grain cleaning shoe mounted therein, hangers supporting one end of the shoe, means for imparting a shaking motion to the shoe, bell cranks pivoted on said frame at the sides of the shoe and at points intermediate the ends thereof, and each having horizontally and vertically disposed arms, links pivotally connected to the swingable ends of said horizontal arms and to the opposite end portion of the shoe, and a weight secured to the vertically disposed arms of said bell cranks for normally maintaining the shoe in substantially a horizontal position lengthwise of the thresher.

17. In a thresher, a frame, a grain cleaning shoe mounted therein, hangers supporting one end of the shoe, bell cranks pivoted on said frame at the sides of the shoe and at points intermediate the ends thereof, and each having a horizontal arm and a vertical arm, links pivotally connected to the swingable ends of said horizontal arms and to the opposite end portion of the shoe and arranged in substantially parallel relation to said hangers whereby a shaking movement may be imparted to the shoe without changing the positions of said bell cranks, a weight secured to the vertically disposed arms of said bell cranks for normally maintaining the shoe in substantially a horizontal position lengthwise of the thresher, and means associated with said weight for counterbalancing a portion of the weight of the shoe.

18. In a combination thresher and harvester mounted for pivotal movement about a transverse axis, an operator's station independent of the thresher and harvester, and an operating mechanism at said station having an operative connection with the thresher and harvester, whereby an operator on said station may tilt the thresher and harvester about said axis to vertically adjust the harvester with respect to the ground.

19. In a combine, a main support, a thresher and harvester substantially counterbalanced on said support, means for tilting the thresher and harvester on said support to adjust the harvester relatively to the ground, and means by which the thresher and harvester may be vertically adjusted on said main support independently of said tilting means.

20. In a combine, a truck comprising a transverse supporting axle having suitable carrying wheels, a thresher and harvester substantially counterbalanced on said axle and adapted to tilt thereon, and means for vertically adjusting the thresher on the axle whereby it may be substantially leveled without materially changing the position of the harvester sickle with respect to the ground.

21. In a combine, a truck comprising a transverse supporting axle having suitable carrying wheels, a thresher mounted on said axle and having a harvester secured to the forward end thereof for operation therewith as a unit, a mechanism on the truck having an operative connection with the harvester and whereby the thresher may be tilted upon said axle to adjust the harvester relatively to the ground, and adjusting screws operatively connecting the thresher with said axle whereby the thresher may be relatively vertically adjusted thereon to level the thresher longitudinally.

22. In a combine, a main support mounted to pivot about a horizontal axis, a thresher and harvester counterbalanced on said support, means for tilting the support about its axis to adjust the harvester height and including a slip connection to prevent damage when the combine strikes an obstruction.

23. In a combination thresher and harvester mounted for pivotal movement about a transverse axis, an operator's station independent of the thresher and harvester, an operating mechanism at said station having an operative connection with the thresher and harvester, whereby an operator on said station may tilt the thresher and harvester upon said axle to vertically adjust the harvester with respect to the ground, and means permitting slippage of said operating mechanism, when subjected to an abnormal load.

24. In a combine, a truck comprising a transverse axle, a thresher and a harvester secured together as a unit and mounted to tilt about the axis of said axle, an operator's station on the truck, an operating mechanism at said station having an operative connection with said unit whereby an operator on said station may tilt the unit upon the axle to relatively adjust the harvester with respect to the ground, and means associated with said operating mechanism for permitting relative pivotal movement of the unit upon said axle without imparting movement to said operating mechanism, should a portion of said unit strike an obstruction.

25. In a combine, a thresher and a harvester secured together for operation as a unit, a main support for said unit, a mechanism for tilting the unit upon said support comprising an operating member, and friction means associated with said mechanism for permitting relative pivotal movement of the unit upon said support without imparting movement to said operating member, should a portion of the unit strike an obstruction.

26. In a combine, a thresher and a harvester secured together for operation as a unit, a main support therefor, an operating mechanism for tilting the unit upon said support comprising a shaft having a crank arm connected to the unit, and a friction clutch connecting said shaft to said mechanism, whereby said rock shaft may be rotated independently of said mechanism to prevent damage, should a portion of said unit strike an obstruction.

27. In a combine, a thresher and a harvester secured together for operation as a unit, a main support therefor, an operating mechanism for tilting the unit upon said support comprising a rock shaft having a crank arm connected to the unit, a friction clutch on said rock shaft for operatively connecting it to said mechanism, a control shaft for operating said mechanism, and means by which said control shaft may be operated from either end, said clutch permitting said unit to tilt upon said support, should the unit accidentally engage the ground or an obstruction.

28. In a combine, a truck comprising a transverse axle, a thresher and harvester counterbalanced on said axle and adapted to tilt thereon to adjust the harvester relatively to the ground, a wheeled support for the forward end of said truck, an operator's station on the truck comprising means for relatively tilting the thresher and harvester on said axle, and means interchangeable with said wheeled support whereby the forward end of the truck may be supported directly upon a tractor.

29. In a combine, a truck comprising a transverse axle, a thresher and harvester mounted for pivotal movement about the axis of said axle to adjust the harvester relatively to the ground, said thresher and harvester being substantially counterbalanced thereon, ground engaging wheels supporting the forward end of the truck, an operating mechanism on said truck having an operative connection with the thresher and harvester, whereby an operator on the truck may tilt the thresher and harvester upon said axle to vertically adjust the harvester, and a draft device interchangeable with said ground-engaging wheels whereby the forward end of the truck may be supported directly upon a tractor.

30. In a combine, a main support, a thresher and harvester substantially counterbalanced on said support and adapted to tilt thereon, means for vertically adjusting the thresher on the support whereby it may be substantially leveled without materially changing the position of the harvester sickle with respect to the ground, said harvester comprising a spiral conveyer for feeding the cut stalks of grain to the thresher, and means for preventing the cut grain from rotating with said spiral conveyer.

31. In a combine, a thresher having a harvester connected to its forward end and extending laterally to one side thereof, said harvester comprising a bottom wall and a back wall, a conveyer disposed lengthwise of the harvester for feeding the cut stalks of grain to the thresher, and a guard secured to the back wall of the thresher at an elevation above the conveyer and extending forwardly and downwardly therefrom over a portion of the conveyer and positioned to be engaged by the cut grain to prevent it from relatively rotating with the conveyer.

MARTIN RONNING.